No. 653,653. Patented July 17, 1900.
M. BOHNERT.
REIN HOLDER.
(Application filed Sept. 22, 1899.)
(No Model.)
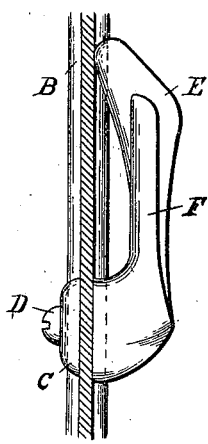
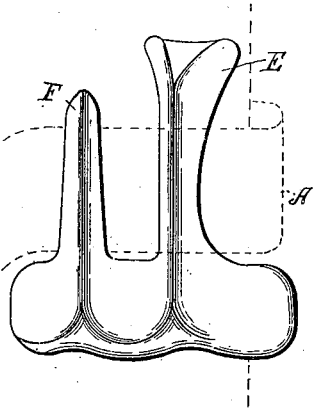
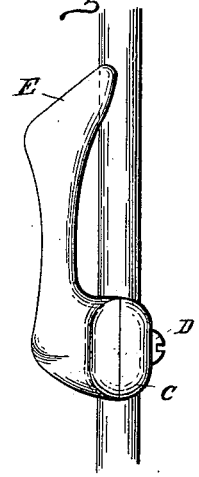
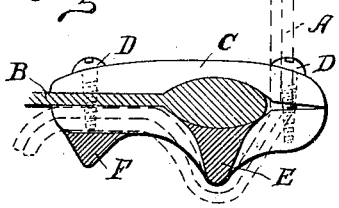
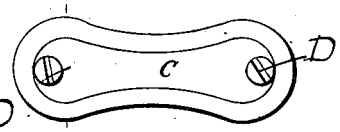
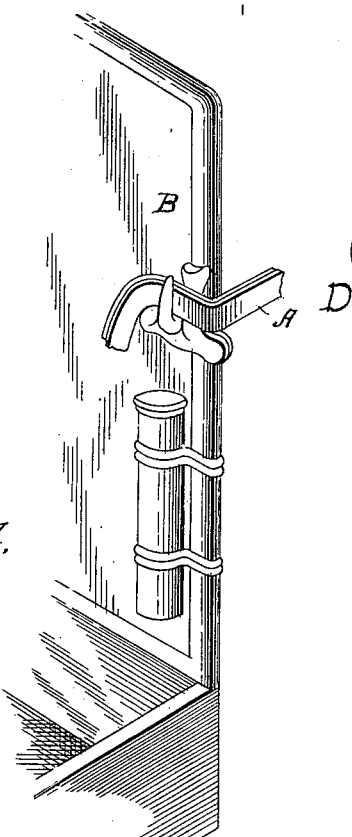

United States Patent Office.

MATHIAS BOHNERT, OF SAN DIEGO, CALIFORNIA.

REIN-HOLDER.

SPECIFICATION forming part of Letters Patent No. 653,653, dated July 17, 1900.

Application filed September 22, 1899. Serial No. 731,345. (No model.)

*To all whom it may concern:*

Be it known that I, MATHIAS BOHNERT, a citizen of the United States, residing at San Diego, in the county of San Diego and State of California, have invented a new and useful Rein-Holder, of which the following is a specification.

My invention relates to rein-holders designed for use on the dashboards of the various kinds of vehicles drawn by draft-animals; and it consists in the novel construction and combination of the parts of the same, as hereinafter fully described and claimed.

In the drawings, Figure 1 is a side elevation, partly in section, of a rein-holder embodying improvements of my invention. Fig. 2 is a front elevation of the same, the reins being shown in dotted lines. Fig. 3 is a side elevation, in full lines, of the improved rein-holder attached to a dashboard. Fig. 4 is an enlarged detail view showing the rein-holder attached to the dashboard of a vehicle and the reins in engagement with the rein-holder. Fig. 5 is a detail view, partly in section and partly in dotted lines, showing a sectional plan view of the rein-holder. Fig. 6 is a detail view of the clamp C and the securing-screws D D.

The rein-holder is preferably made of metal and is secured to the dashboard by screws D D.

The object of the invention is to provide a safe, simple, and expeditious means of securing the reins to the vehicle when it becomes necessary to stop the team. The improvement is designed for use on both leather dashboards and wooden dashboards.

Referring by letter to the accompanying drawings, B designates the dashboard of a vehicle, which is composed of the usual skeleton frame secured to the front of the vehicle-body and covered with the glazed leather commonly used in this class of dashboards.

The inner portion of the rein-holder comprises a base having integral prongs E and F approximately triangular in cross-section rising therefrom.

The outer portion c of the rein-holder comprises an oblong plate having screw-holes for the reception of the screws D D, which pass through said plate c, thence through holes in the frame of the dashboard B, and into screw-seats in the inner portion of the rein-holder to secure the parts in place upon the dashboard B.

The position of the reins A when in place in the rein-holder is shown in dotted lines in plan view in Fig. 5 and in full lines in Fig. 4.

While the reins are secured taut and so firmly as to prevent them from being brushed out of engagement with the rein-holder by the switching of the tail of the animal, yet they can be easily engaged with and removed from the rein-holder by the driver of the vehicle when necessary or desirable.

The prong E is the larger of the two prongs, as the greater strain comes upon this prong.

The device is exceedingly simple, quite inexpensive, and can be readily attached to and be removed from the dashboard of a vehicle.

Having thus fully described my invention, what I claim as new, and desire to secure by Letters Patent, is—

In a rein-holder, the combination with the inner laterally-extended base portion provided with the upwardly-projected integral greater prong E and the upwardly-projected integral lesser prong F and having screw-point seats in its inner face near its opposite ends and a concave recess in its inner face intermediate its ends; of the clamp c having screw-holes near its ends and the securing-screws D D for connecting the base portion and the clamp to the dashboard of a vehicle; substantially as specified.

In testimony whereof I have signed my name to this specification in the presence of two subscribing witnesses.

MATHIAS BOHNERT.

Witnesses:
   CHAS. A. LANG,
   EDWARD I. ANDHAM.